United States Patent [19]

Yamaguchi

[11] Patent Number: 4,488,645

[45] Date of Patent: Dec. 18, 1984

[54] CASE FOR HOUSING INFORMATION MEMORY MEDIA THEREIN

[75] Inventor: Ryoji Yamaguchi, Tokyo, Japan

[73] Assignee: Tokyo Shibaura Denki Kabushiki Kaisha, Japan

[21] Appl. No.: 458,874

[22] Filed: Jan. 18, 1983

[30] Foreign Application Priority Data

Jan. 29, 1982 [JP] Japan ................... 57-12834

[51] Int. Cl.³ ..................... B65D 85/30; B65D 85/57
[52] U.S. Cl. .................................. 206/444; 206/312; 206/472
[58] Field of Search ............... 206/444, 265, 309–313, 206/472, 474, 473, 475; 383/86, 87, 38, 39, 11; 150/43, 46; 229/45; 346/145, 137

[56] References Cited

U.S. PATENT DOCUMENTS

| 1,551,302 | 8/1925 | Gabel | 206/311 |
| 1,585,846 | 5/1926 | Frisbie | 206/310 |
| 3,340,999 | 9/1967 | Froehlig | 206/309 X |
| 3,557,853 | 1/1971 | Jones | 383/86 |
| 3,949,916 | 4/1976 | Yount | 224/901 X |
| 4,084,690 | 4/1978 | Pulse | 206/310 |
| 4,084,694 | 4/1978 | Lainez et al. | 206/444 |
| 4,290,524 | 9/1981 | Azar | 206/309 X |
| 4,327,831 | 5/1982 | Inaba et al. | 206/310 |

FOREIGN PATENT DOCUMENTS

| 650704 | 7/1964 | Belgium | 206/474 |
| 8005177 | 3/1980 | Fed. Rep. of Germany . | |
| 56-53363 | of 1981 | Japan . | |
| 138637 | 3/1930 | Switzerland . | |
| 27122 | of 1908 | United Kingdom | 206/311 |

OTHER PUBLICATIONS

Philips Technical Review, vol. 39, 1980, No. 12, p. 340. "Auto DeSica", Toshiba Iryoyohin.

Primary Examiner—Allan N. Shoap
Assistant Examiner—Bryon Gehman
Attorney, Agent, or Firm—Cushman, Darby & Cushman

[57] ABSTRACT

The invention provides a case for housing information memory media therein, having a base sheet which is integrally constituted by a first case section, a second case section and a third case section through a first connecting portion and a second connecting portion. The first and second connecting portions which are included in the third case section can be folded. When the base sheet is folded so that the first and second case sections oppose each other, a space is formed to contain the main formation memory medium therein. A flexible polyvinyl chloride sheet which forms a pocket is adhered on the first case section 14. The flexible polyvinyl chloride sheet is located on a surface of the base sheet which opposes a surface at which the space is formed to house the main information memory medium therein. A hole is formed near an opening of the pocket to extend through the flexible polyvinyl chloride sheet. A first engaging portion is adhered to a surface portion of the first case section which corresponds to the opening. One end of a band is fixed to the second case section. A second engaging portion is adhered to the other end of the band to be engaged with the first engaging portion. When the first engaging portion engages with the second engaging portion, the case is fixed such that the first case section opposes the second case section. Furthermore, an index memory medium housed in the pocket is prevented slipping out therefrom.

20 Claims, 10 Drawing Figures

CASE FOR HOUSING INFORMATION MEMORY MEDIA THEREIN

BACKGROUND OF THE INVENTION

The present invention relates to a case for housing information memory media therein.

In general, a main information memory medium such as an optical disc and an index memory medium such as a floppy disc which stores index of the main information are held separately. It is, therefore, desirable to house them together.

In particular, a case is desired for housing the main information memory medium and which at the same time can properly house the index memory medium.

SUMMARY OF THE INVENTION

It is an object of the present invention to provide a case for properly housing a main information memory medium together with an index memory medium.

According to an aspect of the present invention, there is provided a case for housing a main information memory medium and an index memory medium together therein, comprising, a base sheet having a first case section, a second case section which is arranged opposable to said first case section and defines together with said first case section a space for housing the main information memory medium therein when said second case section opposes said first case section, and a third case section having a first connecting portion connecting said first case section with said third case section and a second connecting portion connecting said second case section with said third case section, surrounding means which is disposed on the surface portion of said first case section and has a pocket with an opening at one end thereof and which houses the index memory medium inserted through said opening, said surface portion being located on a side opposite to a side at which said space is formed, and said surrounding means being provided with a hole in the vicinity of said opening which extends therethrough, first engaging means disposed in that portion of said first case section which corresponds to said hole, and a band which is extended across both said first case section and said second case section when said first case section opposes said second case section, and one end of which is fixed on said second case section and the other end of which has second engaging means adapted to be engaged with said first engaging means through said hole, whereby while the first engaging means engages the second engaging means said band fixes the first case section to the second case section and prevents slipping out the index memory medium from said pocket.

According to another aspect of the present invention, there is provided a case for keeping a main information memory medium and an index memory medium together therein, comprising, a base sheet having a first case section, a second case section which is arranged opposable to said first case section and defines together with said first case section a space for housing the main information memory medium therein when said second case section opposes said first case section, and a third case section having a first connecting portion connecting said first case section with said third case section and a second connecting portion connecting said second case section with said third case section, surrounding means which is disposed on a surface portion of said first case section and has a pocket with an opening at one end thereof and which houses the index memory medium inserted through said opening, said surface portion being located on a side opposite to a side at which said space is formed, first engaging means disposed in said pocket, and a band which extends across both said first case section and said second case section when said first case section opposes said second case section, and one end of which is fixed on said second case section and the other end of which has second engaging means adapted to be engaged with said first engaging means, whereby while the first engaging means engages the second engaging means said band fixes the first case section to the second case section and prevents the index memory medium from slipping out of said pocket.

DETAILED DESCRIPTION OF THE PREFERRED EMBODIMENTS

Preferred embodiments of the present invention will be described with reference to the accompanying drawings.

Figure 1:
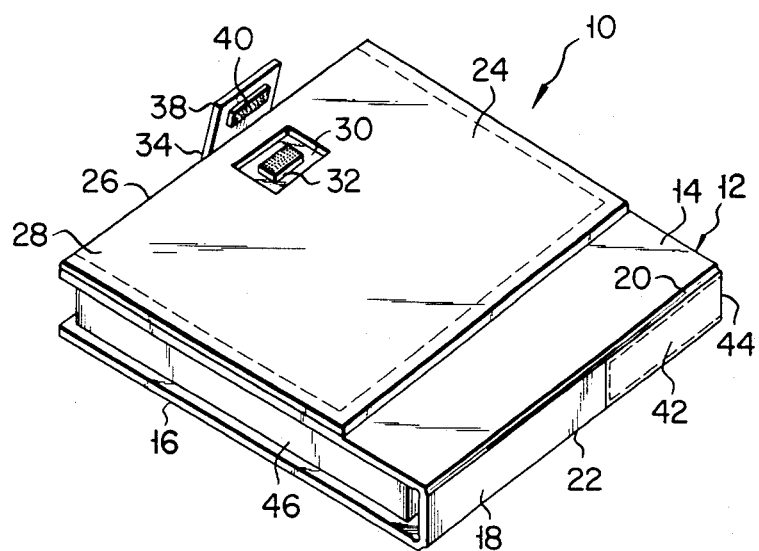
FIG. 1 is a perspective view of a case for housing information memory media therein according to a first embodiment of the present invention.
Figure 2:
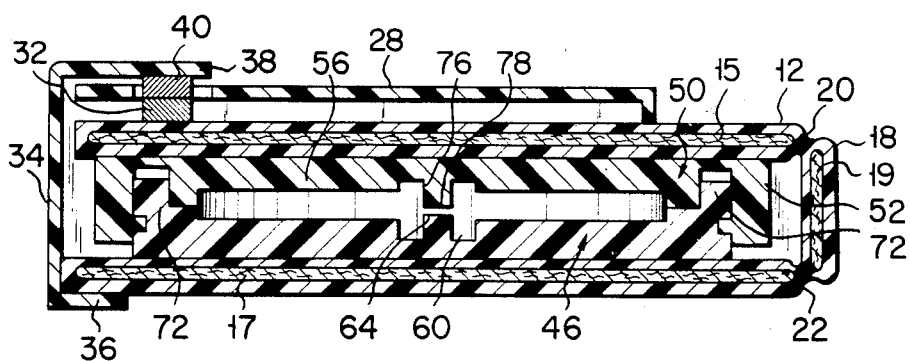
FIG. 2 is a sectional view of the case shown in FIG. 1.

As shown in FIGS. 1 and 2, a case 10 for housing information memory media therein has a base sheet 12 which is constituted by an upper sheet 14 corresponding to a first case section, a lower sheet 16 corresponding to a second case section, and a rear sheet 18 corresponding to a third case section. The upper sheet 14 is integral with the lower sheet 16 through the rear sheet 18. The base sheet 12 comprises flexible polyvinyl chloride sheets, and paperboards 15, 17 and 19 respectively covered with the flexible polyvinyl chloride sheets. Therefore, the paperboard 15 covered with the flexible polyvinyl chloride sheet corresponds to the upper sheet 14; the paperboard 16 covered with the flexible polyvinyl chloride sheet corresponds to the lower sheet 16; and the paperboard 19 covered with the flexible polyvinyl chloride sheet corresponds to the rear sheet 18. The rear sheet 18 further includes a first connecting portion 20 which is connected to the upper sheet 14 and a second connecting portion 22 which is connected to the lower sheet 16. The first and second connecting portions 20 and 22 comprise flexible polyvinyl chloride and are freely folded.

A pocket 24 is provided on the outer surface of the upper sheet 14 to house a floppy disk (not shown) such as an index memory medium therein. The pocket 24 is defined by the upper sheet 14 and a flexible polyvinyl chloride sheet 28 corresponding to a surrounding means and has a substantially rectangular bag shape. One of the sides of the polyvinyl chloride sheet 28 which is parallel to the first connecting portion 20 and which is further away therefrom is not adhered to the outer surface of the upper sheet 14, thereby forming an opening 26 whereas the remaining sides thereof are adhered to the upper sheet 14 by fusion welding. A hole 30 is formed in the flexible polyvinyl chloride sheet 28 in the vicinity of the opening 26. One engaging portion 32 of Velcro (trade name) is adhered on a portion of the upper sheet 14 which corresponds to the hole 30. Velcro is made of synthetic material which adheres when pressed together.

One end 36 of a band 34 is fixed near the edge of the side of the lower sheet 16, which is close to the opening 26. The other end 38 of the band 34 has the other engaging portion 40 of Velcro (trade name) which engages with the one engaging portion 32. Therefore, the band 34 has sufficient length to extend across the opening 26, so that its free end reaches the engaging portion 32. When the case 10 is closed and the two engaging portions 32 and 40 engage each other through the hole 30 formed in the flexible polyvinyl chloride sheet 28, the upper and lower sheets 14 and 16 can be firmly fixed. At the same time, the opening 26 defined between the upper sheet 14 and the polyvinyl chloride sheet 28 is partially closed by the band 34.

A label jacket 42 is disposed on the rear sheet 18. Two sides of the label jacket 42 which are adjacent to another side having an openinq 44 are respectively adhered to the first and second connecting portions 20 and 22. The remaining side lies across the rear sheet 18 and is adhered thereto. The user can insert an appropriate display label into the label jacket through the opening or remove it therefrom. It is noted that the label jacket 42 is made of a transparent flexible polyvinyl chloride.

First and second beds 46 and 50 are provided on the inner surface of the base sheet 12 and engage each other to form a space 45 for holding an optical disc 48 (FIG. 4) such as a main information memory medium when the case is closed, that is, when the base sheet 12 is folded.

Figure 4:
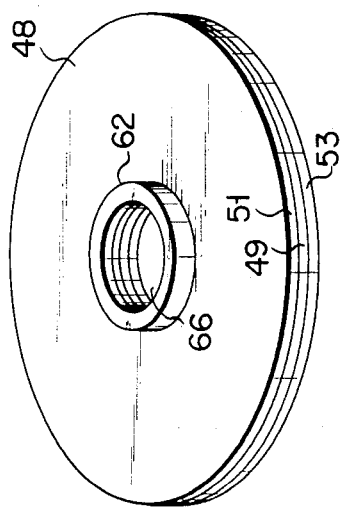
FIG. 4 is a perspective view of an optical disc.

The optical disc 48 will be described with reference to FIG. 4.

In the optical disc 48, a recording sheet 53 is sandwiched between a transparent sheet 51 and a spacer 49. A hole 66 is formed extending through the recording sheet 53 and the transparent sheet 51 and the spacer 49 substantially at the center of the optical disc 48. Support member 62 is provided at the periphery of the hole 66 so as to extend outwardly from the transparent sheet 51, respectively.

The first and second beds 48 and 50 will be described with reference to FIGS. 2 and 3.

Figure 3:
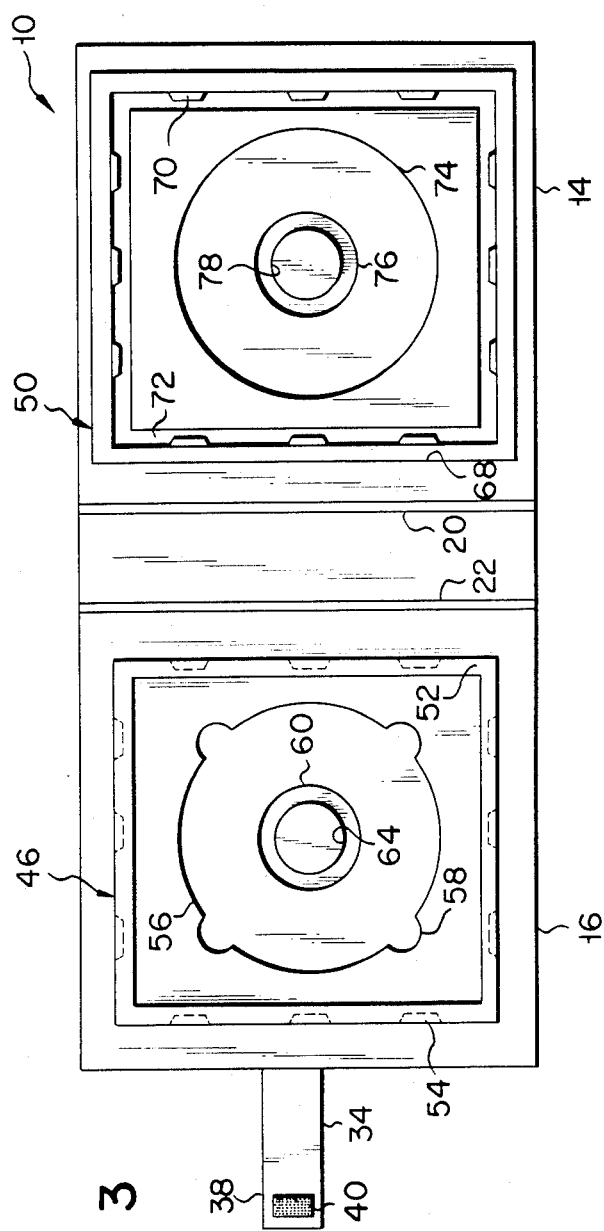
FIG. 3 is a developed view of the case shown in FIG. 1.

FIG. 3 is a developed view of the case 10 and shows the developed base sheet 12. The first and second beds 46 and 50 are respectively formed on the lower and upper sheets 16 and 14 so as to hold the optical disc 48. The first and second beds 46 and 50 are made of unplasticized polyvinyl chloride and have a substantially rectangular outline.

A first wall 52 of a convex shape is formed along the outline of the first bed 46. Three recesses 54 are formed at equal intervals in each portion of the first wall 52 corresponding to each side of the rectangle. The recesses 54 respectively engage with second projections 70 to be described later.

A first recess 56 of a substantially circular shape is formed within the first wall 52 of correspond to the size of the optical disc 48. Four notches 58 are formed at equal intervals along the periphery of the circular recess 56. The notches 58 allow the user to insert the optical disc into the circular recess 56 and remove it therefrom, while the user supports the optical disc with his fingers. As a result, the user can easily and carefully handle the optical disc because of the presence of the notches 58.

A first annular groove 60 is formed inside the first recess 56. The first annular groove 60 has a shape that allows the support member 62 of the optical disc 48 (FIG. 4) to fit therein. A first projection 64 is formed inside the first annular groove 60. The first projection 64 is sufficiently sized to fit within the hole 66 of the optical disc 48. Therefore, the first bed 46 has the same outer shape as the optical disc 48, so that the first bed 46 may properly keep the optical disc 48 therein.

On the other hand, a second wall 68 of a convex shape is formed along the rectangular outline of the second bed 50. The dimensions of the inner sides of the second wall 68 is substantially equal to that of the outer sides of the first wall 52. The three second projections 70 are formed at equal intervals in each side of the rectangular-shaped second wall 68 and can engage with the recesses 54.

A first groove 72 is formed inside the second wall 68. The first groove 72 engages with the first wall 52 when the case 10 is closed. A second circular recess 74 is formed within the first groove 72 so as to correspond to the shape of the optical disc 48. A second annular groove 76 which is deeper than the second recess 74 is formed within the second recess 74. The second annular groove 76 has a shape to fit with the support member 62 of the optical disc 48 (FIG. 4). A third projection 78 is formed within the second annular groove 76. The third projection 78 is sufficiently sized to fit within the hole 66 (FIG. 4) of the optical disc 48. When the case 10 is closed, the first projection 64 and the third projection 78 fit with the hole 66 of the optical disc 48, thus fixing the optical disc 48 therein.

An application use of the case 10 for housing information memory media therein will be described hereinafter.

The case 10 can be developed in a manner shown in FIG. 3. The user supports the periphery of the optical disc 48 and inserts it into the first recess 56. The user then folds the base sheet 12 at the first and second connecting portions 20 and 22 so as to oppose the upper and lower sheets 14 and 16. The first bed 46 is fitted with the second bed 50. In other words, the outer surface of the first wall 52 engages with the inner surface of the second wall 68. As a result, the optical disc 48 can be properly housed in the case 10. The user then inserts the floppy disc (not shown) which stores the index of the storage contents of the optical disc 48 in the pocket 24 through the opening 26 thereof, thereby always housing the optical disc and the floppy disc which stores the index data of the optical disc together in the same case 10.

The user then pulls up the band 34 which then extends across the upper and lower sheets 14 and 16. The other engaging portion 40 of Velcro which is adhered to the band 34 is engaged with the one engaging portion 32 of Velcro which is adhered to the upper sheet 14. As a result, the band 34 holds the upper and lower sheets 14 and 16 together. At the same time, since the opening 26 formed in the pocket 24 is also closed by the above engagement, the floppy disc cannot slip out from the pocket 24 through the opening 26 thereof.

The user inserts a label, which comprises an appropriately written item indicating the contents of the discs, into the label jacket 42 through the opening 44.

According to the first embodiment, the optical disc and the floppy disc can be properly kept together in the same case. Furthermore, since the recesses and the projections are formed to engage with each other, the optical disc 48 can not move and is properly housed in the beds.

Cases for housing information memory media therein according to second and third embodiments of the present invention will be described with reference to FIGS. 5 and 6. The same reference numerals used in the first embodiment denote the same parts in the second and third embodiments, and a detailed description thereof will be omitted.

Figure 5:
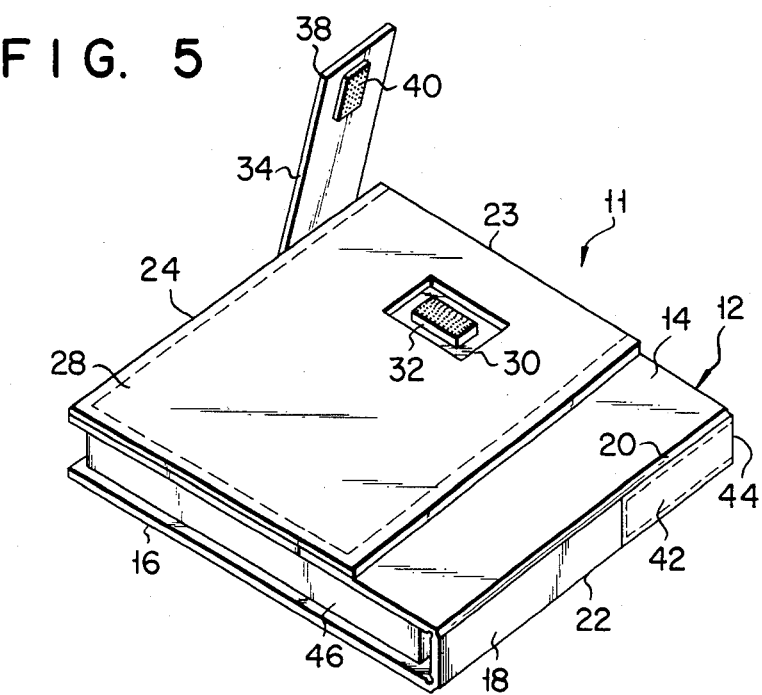
FIG. 5 is a perspective view of a case for housing information memory media therein according to a second embodiment of the present invention.

As shown in FIG. 5, in a case 11 according to the second embodiment of the present invention, an opening 23 is formed in a pocket 24 which is made of a flexible polyvinyl chloride sheet 28 along a side ajdacent to a first connecting portion 20. A hole 30 is formed in the flexible polyvinyl chloride sheet 28 to be adjacent to the opening 23. One engaging portion 32 of Velcro 32 is adhered on a portion of an upper sheet 14 which corresponds to the hole 30. A band 34 is fixed toward one edge of the side of a lower sheet 16 which is spaced apart from the side of the lower sheet 16 which is connected to a rear sheet 18. One end of the band 34 is fixed on the lower sheet 16, whereas the other end 38 thereof has another engaging portion 40 of Velcro which can engage with the one engaging portion 32. According to the second embodiment, when the band 34 is fixed by engaging the engaging portions 32 and 40 with each other through the hole 30, the upper and lower sheets 14 and 16 are properly fixed together. At the same time, the band 34 crosses the opening 23 so as to halve the length thereof.

When the user houses the optical disc 48 between the upper and lower sheets 14 and 16 and the floppy disc in the pocket 24, the optical disc and the floppy disc are kept together in the case 11. Furthermore, by engagement between the engaging portions 32 and 40, the length of the opening 23 is divided. Therefore, the floppy disc can not slip out from the pocket 24.

In summary, the optical disc and the floppy disc are properly kept together in the case 11.

Figure 6:
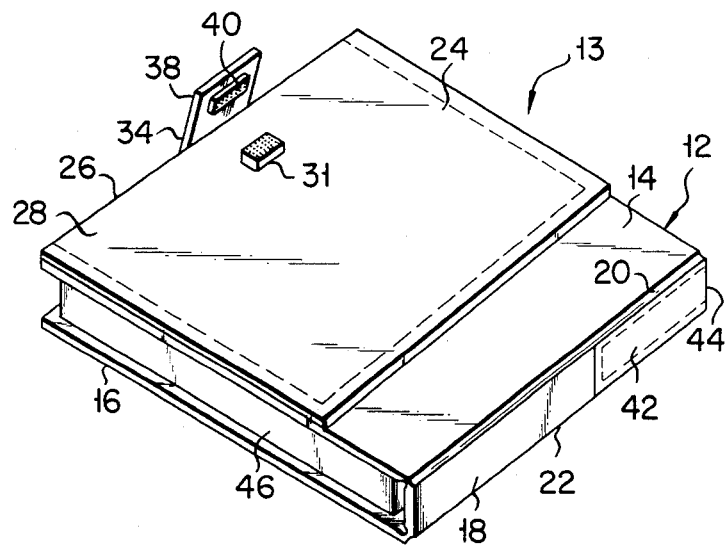
FIG. 6 is a perspective view of a case for housing information memory media therein according to a third embodiment of the present invention.
Figure 7:
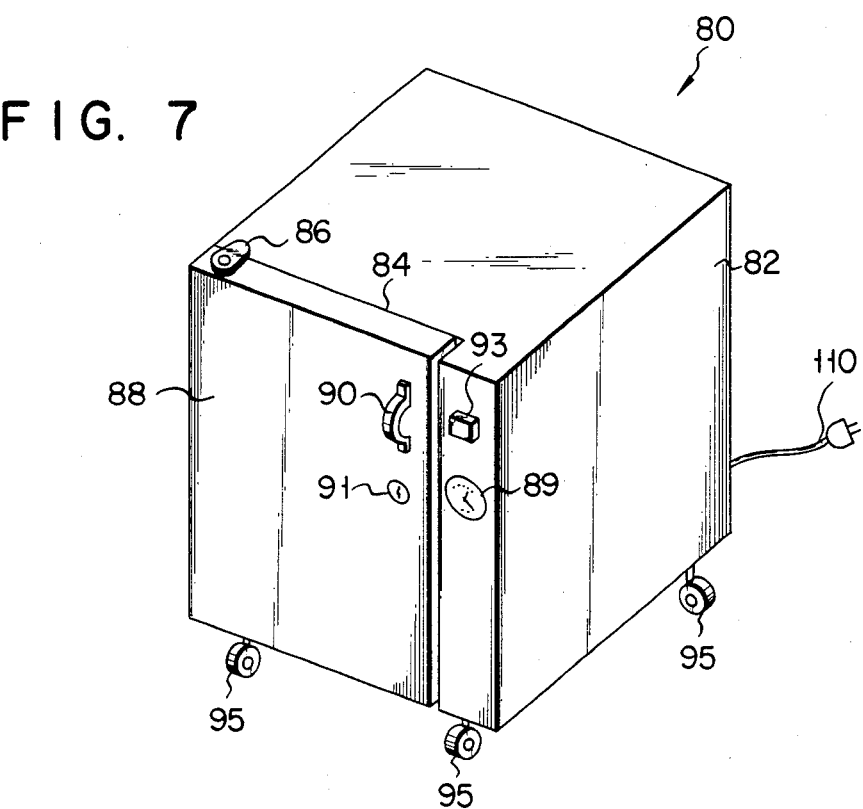
FIG. 7 is a perspective view of a storage box.
Figure 8:
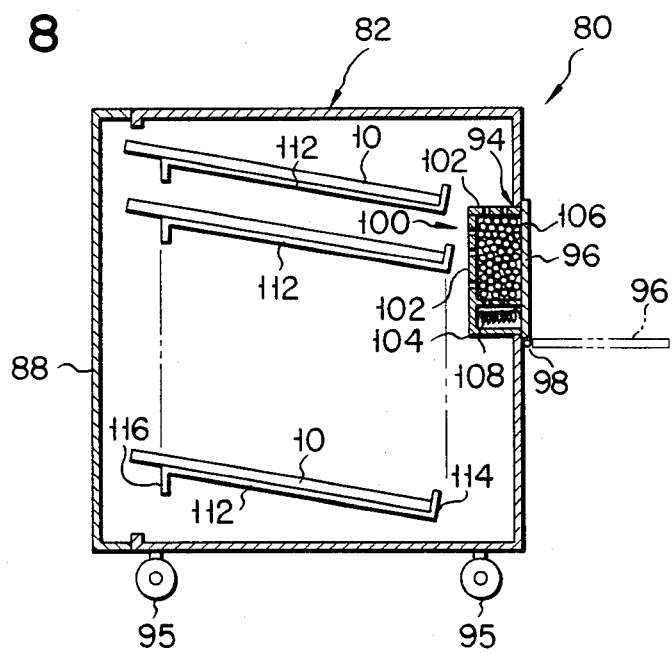
FIG. 8 is a sectional view of the storage box shown in FIG. 7.
Figure 9:
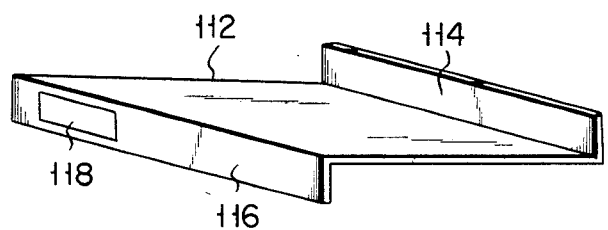
FIG. 9 is a perspective view showing one example of a shelf to be disposed in the storage box shown in FIG. 7.

As shown in FIG. 6, in a case 13 according to the third embodiment of the present invention, an opening 26 is formed in a pocket 24 made of a flexible polyvinyl chloride sheet 28 along that side of an upper sheet 14 which is spaced apart from its parallel side connected to a rear sheet 18. One engaging portion 31 of Velcro is adhered to the flexible polyvinyl chloride sheet 28 close to the opening 26.

According to the third embodiment, when a band 34 is fixed by engaging the engaging portions 31 and 40 with each other, the upper sheet 14 and a lower sheet 16 are fixed. At the same time, part of the opening 26 of the pocket 24 is closed. Therefore, the optical disc and the floppy disc can be properly kept together in the case 13.

It is desirable to keep the case containing the optical disc and the floppy disc in a storage box. Information memory media are generally adversely affected by light and atmospheric moisture which degrade their sensitivity.

A storage box 80 for keeping the case 10 containing information memory media will be described with reference to FIGS. 7 to 10.

An opening 84 is formed at the front side of a housing 82 having a quadrangular prism shape. A door 88 is pivotal about one side of the opening 84 through metal mount pieces 86, and allows the opening 84 to hermetically close. A handle 90 is disposed on the door 88 and a key hole 91 is formed therebelow. Furthermore, a thermo/hygrometer 89 is mounted in the front wall of the housing 82 to indicate a temperature and humidity inside the housing 82. A pilot lamp 93 is disposed above the thermo/hygrometer 89 to indicate the power ON state. Four casters 95 are disposed at the bottom surface of the housing 82 to freely move the housing 82. A rectangular notched hole 94 is formed in the rear wall 92 of the housing 82. A cover 96 is mounted at the lower end of the hole 94 to hermetically close or freely open the hole 94. The lower edge of the cover 96 is pivotal about the lower side of the hole 94 through a hinge 98. A container 100 made of a porous metal sheet such as a punched metal sheet is disposed on the inner surface of the cover 96. The container 100 has an upper portion 102 and a lower portion 104. The upper portion 102 contains a hydroscopic powder such as silica gel 106. The silica gel 106 absorbs moisture within the housing 82. As a result, the humidity in the housing 82 is kept below 40%. The heater 108 is disposed in the lower portion 104. The heater 108 is connected to a power source (not shown) through a timer (not shown) and a cord 110. The heater 108 is energized at a given time interval (e.g., 30 minutes for 10 hours), and the silica gel 106 is heated and dried. At this time, the cover 96 is automatically pivoted backward to open. As a result, when the silica gel 106 is dried, the moisture earlier absorbed thereby is vaporized outside the housing 82. After the silica gel 106 is dried, the cover 96 is closed.

A plurality of shelves 112 are disposed in the housing 82 in a stepwise manner. The shelves 112 are inclined downward from the side of the door 88 to the side of a rear wall 92. Abutment pieces 114 are integrally formed extending upward from the rear ends of the shelves 112 which are respectively adjacent to the rear wall 92. Projections 116 are integrally formed extending downward from the front ends of the shelves 112 which are respectively adjacent to the door 88. A lable 118 is adhered to the surface of each projection 116 which opposes the inner surface of the door 88. The contents of the case 10 may be written on the label 118.

Figure 10:
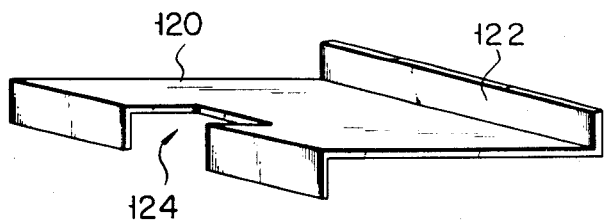
FIG. 10 is a plan view of another example of a shelf to be disposed in the storage box shown in FIG. 7.

A shelf 120 shown in FIG. 10 may be used in place of the shelf 112 disposed in the housing 82. A projection 122 is formed along one sides of the shelf 120. A notch 124 of the shelf 120 is formed on the side adjacent to the door 88. The notch 124 allows the shelf 120 not to support part of the case 10 placed thereon, so that the user can easily grasp the case 10 at the upper and lower sheet portions.

The present invention is not limited to the above embodiments of the present invention. Various changes and modifications may be made within the spirit and scope of the present invention.

For example, an optical disc is examplified as the main information memory medium in the above embodiments. However, the main information memory medium is not limited to an optical disc, but may be extended to a magnetic disc to obtain the same effect as obtained in the above embodiments.

Snap fasteners may be mounted on the other end of the band 34 and the portion of the upper sheet 14 which corresponds to the hole formed in the flexible polyvinyl chloride sheet constituting the pocket 24, in place of the Velcro engaging portions, so as to obtain the same effect as obtained in the above embodiments.

The number of bands is not limited to one. For example, two bands may be used mounted to be parallel to each other to obtain the same effect as obtained in the above embodiments. In this case, a number of Velcro engaging portions are required which correspond to the number of bands.

The bands are disposed to extend across the opening in the first and third embodiments. However, a band may be formed along the opening to obtain the same effect.

What is claimed is:

1. A case for keeping a main information memory medium and an index memory medium for indicating the address of the information stored in said main information memory medium together therein, said case comprising:

a base sheet having a first case section, a second case section, and a third case section having a first connecting portion connecting said first case section with said third case section and a second connecting portion connecting said second case section with said third case section, said first and second connecting portions permitting said first and second case sections to be foldable between an opened position and a closed position wherein said first and second case sections oppose one another while in said closed position, said first and second case sections together defining a space when in said closed position to house said main information medium put therein when said first and second case sections were in said opened position;

surrounding means disposed on a surface portion of said first case section defining a pocket with an opening at one end thereof for housing the index memory medium inserted through said opening, said surface portion being located on a side opposite to a side at which said space is formed, said surrounding means defining a hole in the vicinity of said opening which extends therethrough;

first engaging means disposed in that portion of said first case section which corresponds to said hole; and band means which extends across both said first case section and said second case section when said first case section opposes said second case section in said closed position, and one end of which is fixed on said second case section and the other end of which has second engaging means adapted to be engaged with said first engaging means through said hole, said band means for fixing the first case section to the second case section and for preventing the index memory medium from passing beyond said hole and slipping out of said pocket when said first engaging means engages said second engaging means.

2. A case according to claim 1, wherein said base sheet integrally comprises said first case section, said second case section, and said third case section.

3. A case according to claim 2, wherein said base sheet comprises paperboard portions and flexible polyvinyl chloride portions which cover said paperboard portions.

4. A case according to claim 1, wherein said first case section and said second case section individually incorporate bedding means having recesses matching the shape of the main information memory medium, said bedding means defining said space for housing the main information memory medium therein when said first case section opposes said second case section.

5. A case according to claim 4, wherein said recesses respectively have walls which face a periphery of the main information memory medium when the main information memory medium is contained in said case.

6. A case according to claim 5, wherein said bedding means have a plurality of notches along said walls.

7. A case according to claim 4, wherein said bedding means respectively have third engaging means and fourth engaging means which engage each other when said first case section opposes said second case section.

8. A case according to claim 7, wherein said bedding means, said third engaging means and said fourth engaging means are integrally formed of unplasticized polyvinyl chloride, and said third engaging means and said fourth engaging means have respectively a projection and a recess which engage each other.

9. A case according to claim 1, wherein said first engaging means and said second engaging means respectively comprise a synthetic material which adheres when pressed together.

10. A case according to claim 1, wherein said third case section has a label jacket which is made of a transparent material at a side opposite to a side at which said space is formed in said base sheet, said label jacket being provided with an opening through which a label may be inserted.

11. A case for keeping a main information memory medium and an index memory medium together therein, comprising:

a base sheet having a first case section, a second case section which is arranged opposable to said first case section and defines together with said first case section a space for housing the main information memory medium therein when said second case section opposes said first case section, and a third case section having a first connecting portion connecting said first case section with said third case section and a second connecting portion connecting said second case section with said third case section;

surrounding means which is disposed on a surface portion of said first case section and has a pocket with an opening at one end thereof and which houses the index memory medium inserted through said opening, said surface portion being located on a side opposite to a side at which said space is formed, said surrounding means defining a hole in the vicinity of said opening which extends therethrough;

first engaging means disposed in said pocket at a location underlying said hole; and a band which extends across both said first case section and said second case section when said first case section opposes said second case section, and one end of which is fixed on said second case section and the other end of which has second engaging means adapted to be engaged with said first engaging means through said hole, whereby while the first engaging means engages the second engaging means said band fixes the first case section to the second case section and prevents the index memory medium from passing beyond said hole and slipping out of said pocket.

12. A case according to claim 11, wherein said base sheet integrally comprises said first case section, said second case section, and said third case section.

13. A case according to claim 12, wherein said base sheet comprises paperboard portions and flexible polyvinyl chloride portions which cover said paperboard portions.

14. A case according to claim 11, wherein said first case section and said second case section respectively incorporate bedding means having recesses corresponding to the main information memory medium, said bedding means defining said space for housing the main information memory medium therein when said first case section opposes said second case section.

15. A case according to claim 14, wherein said recesses respectively have walls which face a periphery of the main information memory medium when the main information memory medium is contained in said case.

16. A case according to claim 15, wherein said bedding means have a plurality of notches along said walls, respectively.

17. A case according to claim 14, wherein said bedding means respectively have third engaging means and fourth engaging means which engage each other when said first case section opposes said second case section.

18. A case according to claim 17, wherein said bedding means, said third engaging means and said fourth engaging means are integrally formed of unplasticized polyvinyl chloride, and said third engaging means and said fourth engaging means have respectively a projection and a recess which engage each other.

19. A case according to claim 11, wherein said first engaging means and said second engaging means respectively comprise a synthetic material which adheres when pressed together.

20. A case according to claim 11, wherein said third case section has a label jacket which is made of a transparent material at a side opposite to a side at which said space is formed in said base sheet, said label jacket being provided with an opening through which a label may be inserted.

* * * * *